(12) United States Patent
Mirabile

(10) Patent No.: US 7,967,314 B1
(45) Date of Patent: Jun. 28, 2011

(54) WHEELED VEHICLE DRIVE MECHANISM WITH HAND LEVER ARM

(76) Inventor: Nicholas F. Mirabile, N. Richland Hills, TX (US)

( * ) Notice: Subject to any disclaimer, the term of this patent is extended or adjusted under 35 U.S.C. 154(b) by 0 days.

(21) Appl. No.: 12/930,376

(22) Filed: Jan. 5, 2011

Related U.S. Application Data

(63) Continuation-in-part of application No. 12/657,072, filed on Jan. 12, 2010.

(51) Int. Cl.
 *B62M 1/14* (2006.01)
(52) U.S. Cl. ............... 280/242.1; 280/244; 280/245
(58) Field of Classification Search .............. 280/210, 280/242.1, 243, 244, 245, 246, 247, 248, 280/251, 252, 253, 254, 255, 256, 257, 258
See application file for complete search history.

(56) References Cited

U.S. PATENT DOCUMENTS

| | | | | |
|---|---|---|---|---|
| 98,092 A * | 12/1869 | Neale | .............................. | 74/132 |
| 285,035 A * | 9/1883 | Holland | .......................... | 74/143 |
| 904,062 A * | 11/1908 | Hamill | .......................... | 280/254 |
| 926,131 A * | 6/1909 | McGowan | .................... | 280/225 |
| 1,276,168 A * | 8/1918 | Buchholz | ...................... | 280/245 |
| 1,395,842 A * | 11/1921 | Leach | ............................ | 74/130 |
| 1,443,904 A * | 1/1923 | Parsons | ......................... | 74/130 |
| 1,598,788 A * | 9/1926 | Sinderson | .................... | 280/240 |
| 2,085,657 A * | 6/1937 | Heisdorf | ...................... | 280/245 |
| 5,007,655 A * | 4/1991 | Hanna | ........................ | 280/250.1 |
| 5,330,218 A * | 7/1994 | Escudero | ..................... | 280/245 |
| 6,708,997 B2 * | 3/2004 | Chait | ............................ | 280/245 |
| 2008/0129007 A1 * | 6/2008 | Lee | ............................. | 280/242.1 |

\* cited by examiner

*Primary Examiner* — Anne Marie M Boehler
*Assistant Examiner* — Marc A Scharich
(74) *Attorney, Agent, or Firm* — Lynn E. Barber

(57) ABSTRACT

A wheeled vehicle drive mechanism is provided that has a hand leverage arm and one or more horizontal gears to move associated drive gears. A drive chain meshed with a fixed drive sprocket keyed to the drive gears may be used to transmit motion from the horizontal gears to the vehicle wheels.

4 Claims, 19 Drawing Sheets

US 7,967,314 B1

WHEELED VEHICLE DRIVE MECHANISM WITH HAND LEVER ARM

CROSS-REFERENCE TO RELATED APPLICATIONS

This application is a continuation-in-part of copending application Ser. No. 12/657,072 filed on Jan. 12, 2010.

BACKGROUND OF THE INVENTION

1. Field of the Invention

This invention relates to self-propelled wheeled devices with increased travel distance due to a hand lever arm and horizontal gear.

2. Description of the Related Art

There are a number of light-weight wheeled vehicles that are currently manually self-propelled by the driver, such as wheel-chairs, or in some models are powered by small motors, such as go-carts. Other wheeled vehicles, such as children's wagons, are typically caused to move by being pulled or pushed by someone, or in the case of tricycles, are pedaled.

The copending parent application herein provides a bicycle having a pedal and leverage arm, in which bicycle the cyclist's body weight is used to a more efficient potential, because the pivot point is at the rear of the bicycle and the pedal movement is straight down and up. This bicycle includes a pedal leverage arm, and a lever arm tension spring holding the rear of the pedal leverage arm to the rear of the bicycle through a bearing as known in the art, to connect the frame to the arm and cause the pedal leverage arm and pedal to be forced upward when the pedal is in the lowermost position. A drive sprocket spindle, drive sprocket, drive gear, and vertical gear are provided on each side of the bicycle. The vertical gear is attached to the pedal leverage arm so that the vertical gear can mesh with the drive gear. A chain on each side of the bicycle extends around the drive sprocket and the wheel sprocket. The drive sprocket spindle on each side of the bicycle extends from the drive sprocket support, through the drive sprocket, through the drive gear support to the drive gear on that side of the bicycle. Downward movement of a pedal leverage arm causes the attached vertical gear to move downward, causing the meshed drive gear to turn, which causes the drive sprocket spindle on that side of the bicycle to turn, which causes the chain that goes around the drive sprocket on that side of the bicycle to turn, which causes the wheel sprocket and wheel to turn, due to permanent attachment of both the drive sprocket and drive gear to the drive sprocket spindle.

Other single-user wheeled vehicles that are self-propelled are often difficult or energy intensive to be moved from one place to another. In some cases, such as in some carts and wheel chairs, such single-user wheeled vehicles are made with added small motors to assist the driver in moving the vehicle.

It is an object of the invention to provide a means where a preferably seated driver of a wheeled vehicle can use the driver's hands, with an arrangement of a hand lever arm and one or more horizontal gears to move associated drive gears, and in some embodiments, a chain, to cause the vehicle to move forward. The hand lever arm and horizontal gear arrangement of the invention may be added to any vehicle on which the driver can be positioned, such as on a seat, and which has wheels and has, or can be provided with a central frame extending between a forward wheeled and a rearward wheel and/or wheel axle.

Other objects and features of the inventions will be more fully apparent from the following disclosure and appended claims.

SUMMARY OF THE INVENTION

The invention herein is a wheeled vehicle drive mechanism using a hand leverage arm and one or more horizontal gears to move associated drive gears. A drive chain meshed with a fixed drive sprocket may be used to transmit motion from the horizontal gears to the vehicle wheels.

Other objects and features of the inventions will be more fully apparent from the following disclosure and appended claims.

DETAILED DESCRIPTION OF THE INVENTION AND PREFERRED EMBODIMENTS THEREOF

Figure 1:
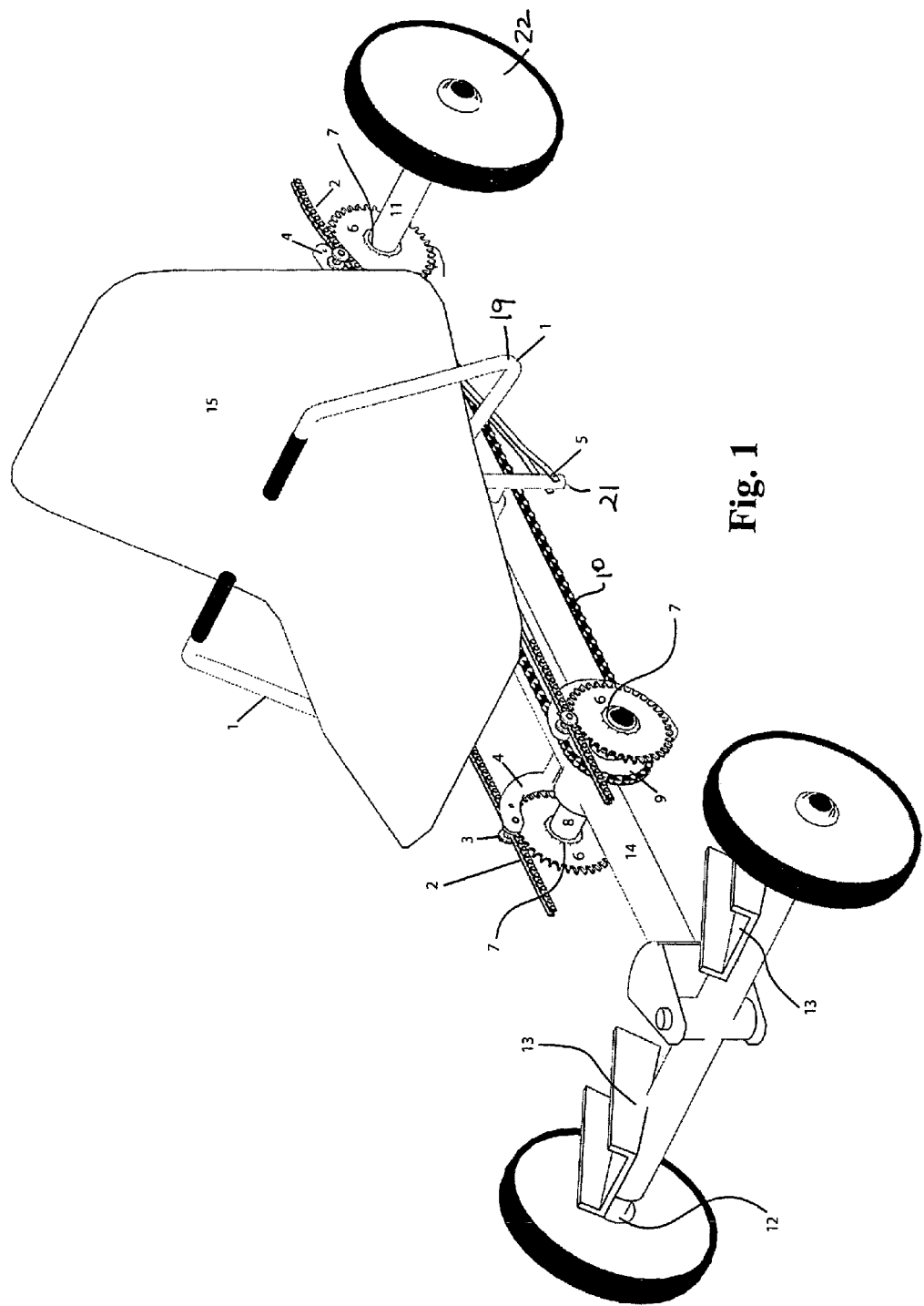
FIG. 1 is a front side perspective view of a cart in the first embodiment of the invention having a dual drive gear mechanism.

The present invention comprises a drive mechanism for a wheeled vehicle, such as a cart, comprising a novel hand lever arm, providing a more efficient way to use the body's force than has been previously provided by such structures.

Analogously to Applicant's prior pedal leverage arm invention having an arrangement with vertical, drive and sprocket gears, the invention herein uses a hand lever arm for carts, wheel-chairs, tricycles, wagons and other types of small, self-propelled vehicles. While the vehicle shown in the figures herein is a cart with two axles and four wheels, the components of the invention as discussed below are easily modified by those of ordinary skill in the art to be used with a two-wheeled vehicle (as a bicycle), for example by adding a single axle perpendicular to the direction of movement to which axle the drive gears and associated structures disclosed herein can be attached and by modifying the handlebars to be movable as discussed below; or for a three-wheeled vehicle (as a tricycle) by utilizing the rear axle and/or by adding an axle, and the like.

In the invention herein, the leverage principle is the same as in the parent application, except instead of using the feet and legs to power the gears, the hands and arms and back are the source of power. Instead of a vertical gear, the corresponding gear in the invention herein is generally horizontal, but does the same thing as the vertical gear, which is to turn a drive gear, which in some of the embodiments herein turns a fixed drive sprocket, which turns the wheels with the use of a chain.

The different embodiments of the invention herein all use a hand lever arm and preferably at least two horizontal gears (although a single horizontal gear together with a transmission as known in the art could be used). In the simplest embodiment of the invention herein (the third embodiment as discussed herein), the hand lever arm and horizontal gear directly turn the wheel sprocket of the driven (rear) axle. In the other embodiments shown herein, the hand lever arm and horizontal gear(s) turn a drive gear and fixed drive sprocket on the sprocket axle with the use of a chain. As discussed in more detail below, there are ratchet mechanisms on each drive gear, and the invention provides means for driving the vehicle forward, using the horizontal gears and the ratchet mechanisms, whether the hand lever arm is going forward or backward.

When the invention is used, for example, with a tricycle, the new drive method of the invention herein eliminates the old tricycle pedals. The invention gives a more favorable drive to be used on the above-mentioned toys, small sport vehicles and carts, or wheel chairs.

Because of all the different types of wheeled vehicles' shapes, the hand lever arm and horizontal gear location on the various carts or other wheeled vehicles with which the invention herein can be used will vary somewhat in shape and location. The vehicles' frame type will determine the position of the hand lever arm and associated horizontal gears and drive support setup, which may be on either side of the vehicle or in the middle of the vehicle. Also, the position of the seat or chair and the center of gravity will affect the particular arrangement that will provide the best mechanical advantage to the person using the vehicle; however those of skill in the art can easily adapt the specific embodiments discussed herein to provide a means of moving a wide variety of vehicles.

Generally the invention herein is a drive mechanism for a wheeled vehicle having a frame, at least two axles, and at least three wheels, comprising: a hand lever arm movable forward and backward by a driver of the wheeled vehicle; at least two horizontal gears comprising a first horizontal gear and a second horizontal gear, each horizontal gear associated and meshed with a toothed drive gear on an axle of the vehicle and each horizontal gear being attached to the hand lever arm; a horizontal gear bearing and a horizontal gear bearing frame mount associated with each horizontal gear, and aligned to push the horizontal gear to engage the toothed drive gear; a ratchet mechanism on each drive gear, wherein movement of the hand lever arm forward causes: i) the first horizontal gear to rotate the drive gear associated with the first horizontal gear, which causes the wheels to move forward, and ii) the ratchet mechanism on the second horizontal gear to release the drive gear associated with the second horizontal gear; and wherein movement of the hand lever arm rearward causes: i) the second horizontal gear to rotate the drive gear associated with the second horizontal gear, which causes the wheels to move forward, and ii) the ratchet mechanism on the first horizontal gear to release the drive gear associated with the first horizontal gear.

In the third embodiment, the first horizontal gear and the second horizontal gear extend rearward from the hand lever arm; wherein the at least one axle is a rear axle of a vehicle; and wherein the first horizontal gear is meshed with the bottom of the drive gear associated with the first horizontal gear, and the second horizontal gear is meshed with the top of the drive gear associated with the second horizontal gear.

In the second embodiment of the invention, the first horizontal gear extends forward from the hand lever arm and the second horizontal gear extends rearward from the hand lever arm; wherein the at least one axle comprises a rear axle and a sprocket axle; and wherein the first horizontal gear is meshed with the top of a drive gear on the sprocket axle and the second horizontal gear is meshed with the top of a drive gear on the rear axle, the drive mechanism further comprising a drive chain extending between a fixed drive sprocket on the rear axle and a sprocket axle and being turned by movement of the chain, movement of each of the fixed drive sprockets being keyed to movement of the drive gear that is on the same axle as the fixed drive sprocket.

The first embodiment of the invention further comprises a third horizontal gear extending forward from the hand lever arm in mirror image to the first horizontal gear and on the opposite side of the vehicle as the first horizontal gear, and a fourth horizontal gear extending rearward from the hand lever arm in mirror image to the second horizontal gear and on the opposite side of the vehicle as the second horizontal gear.

In summary, the invention herein provides a hand drive mechanism for a wheeled structure in which there is a hand lever arm and a series of gears. Referring now to the figures, while there are distinct structural differences between the embodiments of the invention herein, all three embodiments, in attachment to a vehicle frame 14 as discussed herein, utilize a hand lever arm 1, at least two horizontal gears 2, at least two drive gears 6, and an associated horizontal gear bearing 3 and horizontal gear bearing frame mount 4 for each horizontal gear 2. The drive gears 6 used in the invention are preferably the same whether placed at the rear of the vehicle or toward the front of the vehicle, with the term "rear drive gear" and "forward drive gear" being used herein to indicate the location of the gear being discussed, rather than any difference in structure or function. Preferably for the cart shown in the figures herein, a drive gear having a diameter of about 3 to about 4 inches has been found satisfactory as has a larger drive sprocket of about 5-7 inches diameter.

The three main embodiments of the invention are: 1) a first embodiment having a dual drive gear mechanism shown in FIGS. 1-10; 2) a second embodiment having a single drive gear mechanism shown in FIGS. 11-15; and 3) a third embodiment having a direct drive gear mechanism shown in FIGS. 16-19. In each of the embodiments of the invention herein, a hand lever arm, preferably having two handles, drives one or more (horizontal gears, which cause the wheels to move, indirectly or directly. In the first two embodiments, the drive gears drive a fixed drive sprocket as discussed herein and utilize a drive chain 10.

Depending on the embodiment of the invention, preferably there are 2 to 4 toothed drive gears 6 used in the invention. The structure and use of the drive gear 6 is the same whether placed forward on the front axle of the vehicle or rearward on the rear axle of the vehicle. Each drive gear 6 is provided with a ratchet mechanism as known in the art, for example, a typical bicycle ratchet.

Referring now to the figures, the figures show a wheeled vehicle, such as a cart, outfitted with the invention herein. The cart has a frame 14, which as shown for a cart is a generally elongated frame (FIGS. 1-2, 4, 6-7, 9-12, 14-16, 18-19) extending from the front axle 12 of the vehicle to a rear axle 11. In the vehicle shown herein, foot pads 13 are provided on the front axle 12. In the first two embodiments, a sprocket axle 8 is provided between rear axle 11 and front axle 12, which is perpendicular to frame 14 in the first two embodiments, for placement of the forward drive gears 6 (FIGS. 1-4, 6-15).

In all three embodiments of the invention herein, a cross-bar 17 (e.g., FIG. 2) extends outward perpendicular to frame 14 for attachment of the hand lever arm 1. While shown as being directly beneath the seat in the figures as is preferred, the location of this cross-bar 17 may be adjusted forward or backward as may be desired in the manufacture of a cart of the invention. Other framing parts as known in the art are provided, such as a seat support 16.

Figure 2:
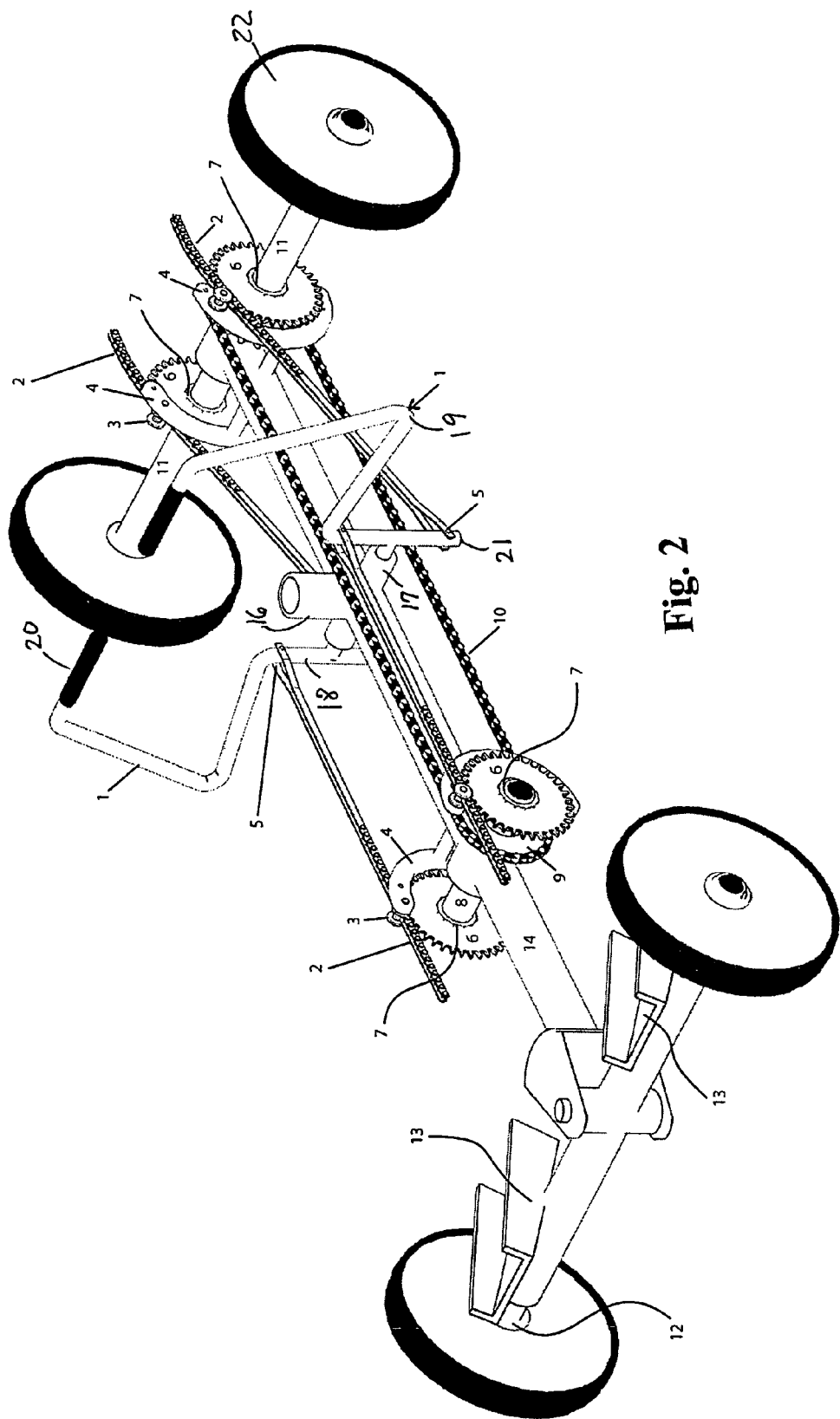
FIG. 2 is a front side perspective view of the cart of FIG. 1 in which the seat has been removed to show the underlying frame and drive mechanism.
Figure 3:
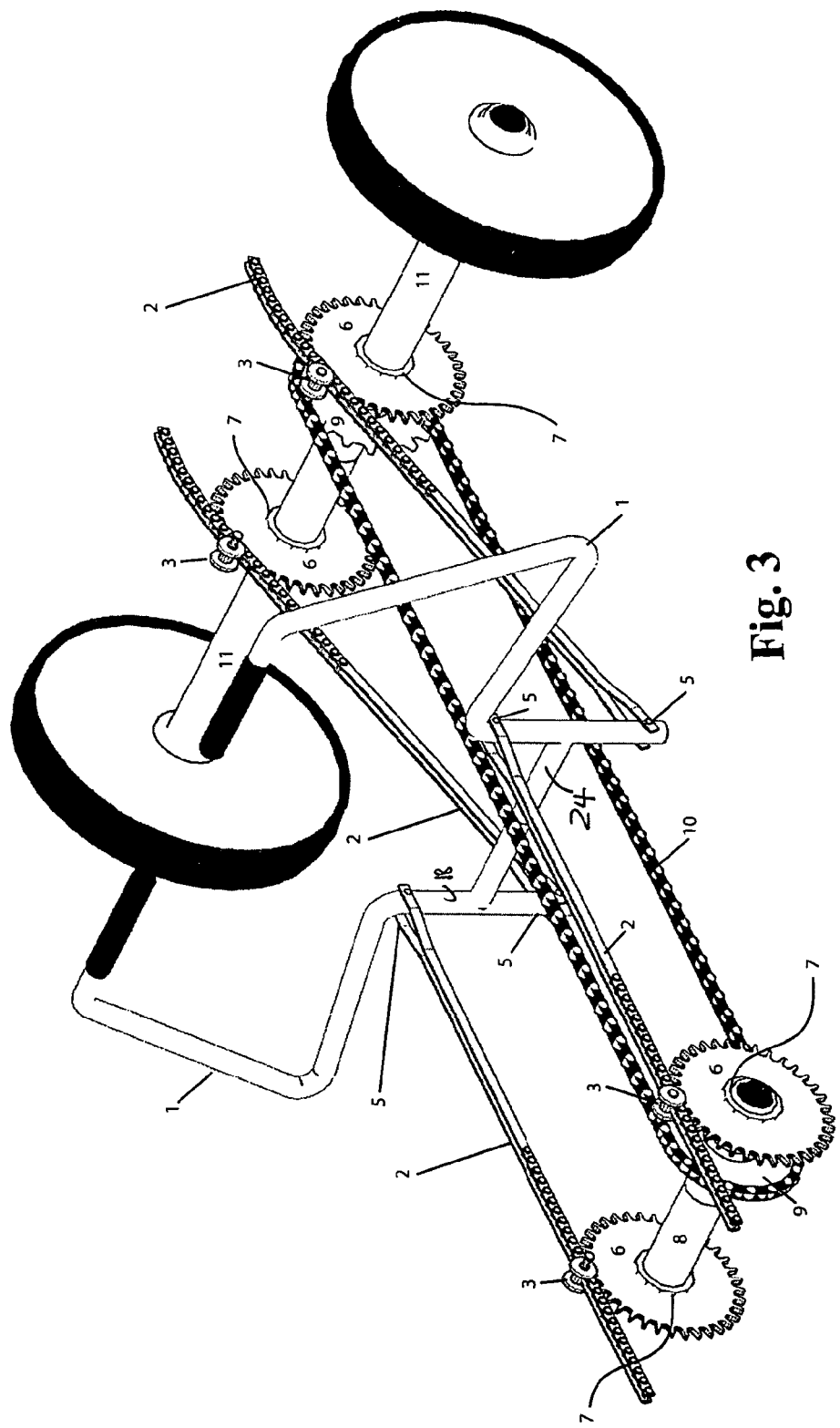
FIG. 3 is a front side perspective view of the cart of FIG. 2 in which the frame has been removed.

Preferably the hand lever arm 1 has two mirror-image halves, each with a handle 20 as shown for the driver to grasp, as shown for example, in FIG. 2. Thus, the invention provides two hand lever arms 1, one on each side of the cart. As shown in the figures (FIGS. 2-3, 9-10, 12-13, 15-17), each hand lever arm 1 has a preferably vertical portion 18 extending upward from below attachment to the cross-bar 17, then bends outward, preferably to a right angle bend 19, and then upward to a handle 20 that is located where the hands of a rider of the cart can grasp the handle 20 of the hand lever arm 1. Above the lower end 21 of each half of the hand lever arm is a lever arm member 24 that is rotatably attached to the cross-bar 17 (for example, by being inserted therein), so that when a driver pushes forward on the hand lever arm 1, the hand lever arm 1 can move forward due to rotation of the lever arm member 24 with respect to the cross-bar 17, and when the driver pulls the hand lever arm 2 rearward, the hand lever arm 1 can move rearward due to rotation of the lever arm members 24 with respect to the cross-bar 17. Each hand lever arm 1 is preferably an elongated metal structure formed as discussed above as known in the art, so that the handle 20 is on the upward end and is located above the level of the seat 15 for easy grasping by the driver of the vehicle.

Preferably the hand lever arm 1 has two mirror-image halves, each with a handle 20 as shown for the driver to grasp, as shown for example, in FIG. 2. Thus, the invention provides two hand lever arms 1, one on each side of the cart. As shown in the figures (FIGS. 2-3, 9-10, 12-13, 15-17), each hand lever arm 1 has a preferably vertical portion 18 extending upward from below attachment to the cross-bar 17, then bends outward, preferably to a right angle bend 19, and then upward to a handle 20 that is located where the hands of a rider of the cart can grasp the handle 20 of the hand lever arm 1. Above the lower end 21 of each half of the hand lever arm is a lever arm member 24 that is rotatably attached to the cross-bar 17 (for example, by being inserted therein), so that when a driver pushes forward on the hand lever arm 1, the hand lever arm 1 can move forward due to rotation of the lever arm member 24 with respect to the cross-bar 17, and when the driver pulls the hand lever arm 1 rearward, the hand lever arm 1 can move rearward due to rotation of the lever arm members 24 with respect to the cross-bar 17. Each hand lever arm 1 is preferably an elongated metal structure formed as discussed above as known in the art, so that the handle 20 is on the upward end and is located above the level of the seat 15 for easy grasping by the driver of the vehicle.

In the first embodiment of the invention there are two forward horizontal gears 2 attached to the hand lever arm 1 above the attachment site 5 of two rearward horizontal gears 2. In this embodiment of the invention, there is a horizontal gear 2 that is attached to or near the lower end 21 of each hand lever arm 1 and extends rearward. Just below the right angle bend 19 of each hand lever arm 1, there is another horizontal gear 2 attached that extends forward as shown in FIGS. 2-5. Thus, in this embodiment, preferably the forward horizontal gears 2 are generally positioned above the rearward horizontal gears 2 as can best be seen in FIGS. 4-5.

Figure 4:
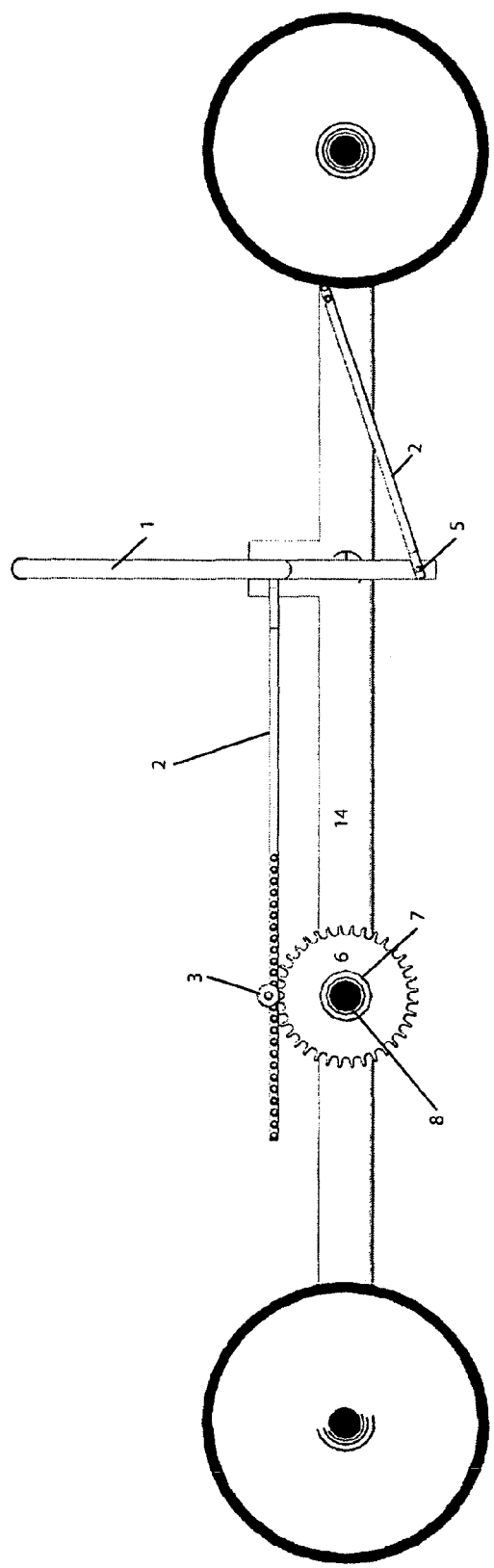
FIG. 4 is a side elevational view of the cart of the invention (without the seat) showing where both horizontal gears are connected to the hand lever arm.
Figure 5:
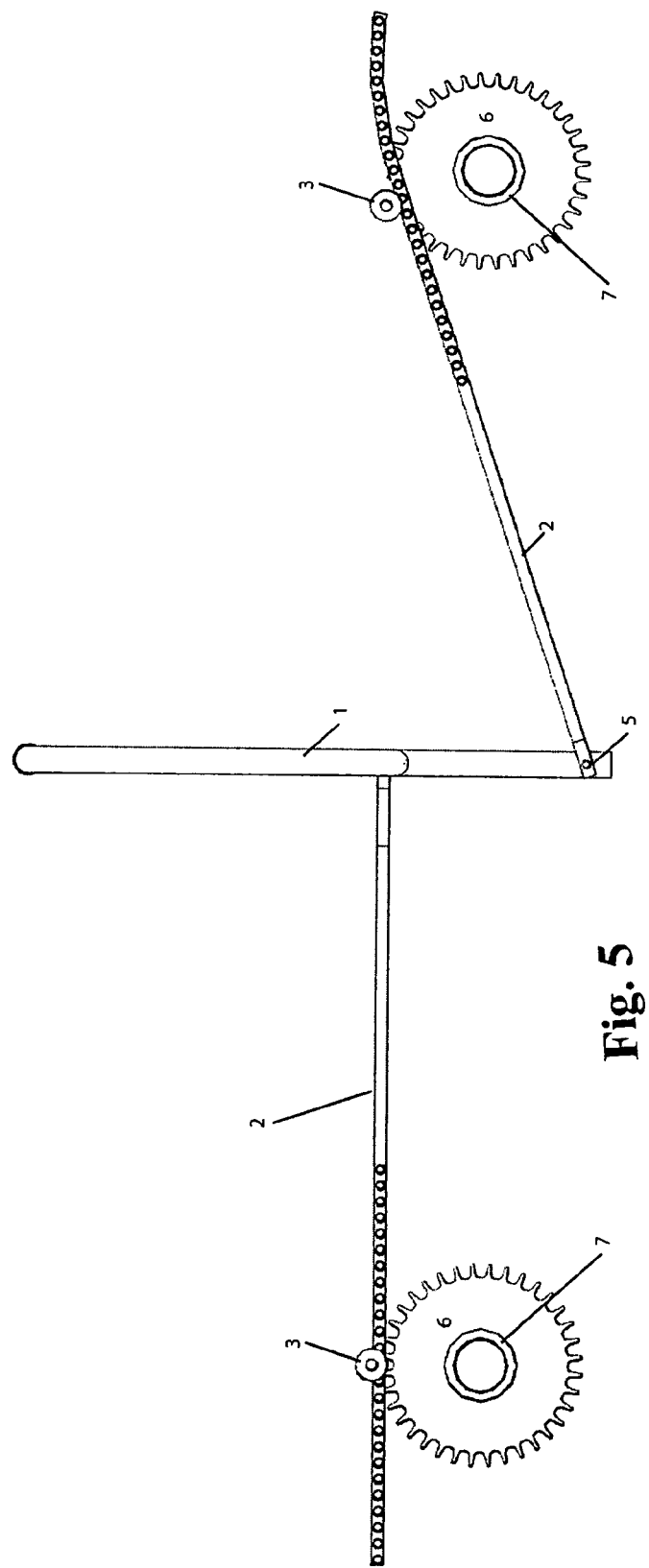
FIG. 5 is a side elevational view of the embodiment of FIG. 1 showing the horizontal gears meshed with the drive gears.
Figure 6:
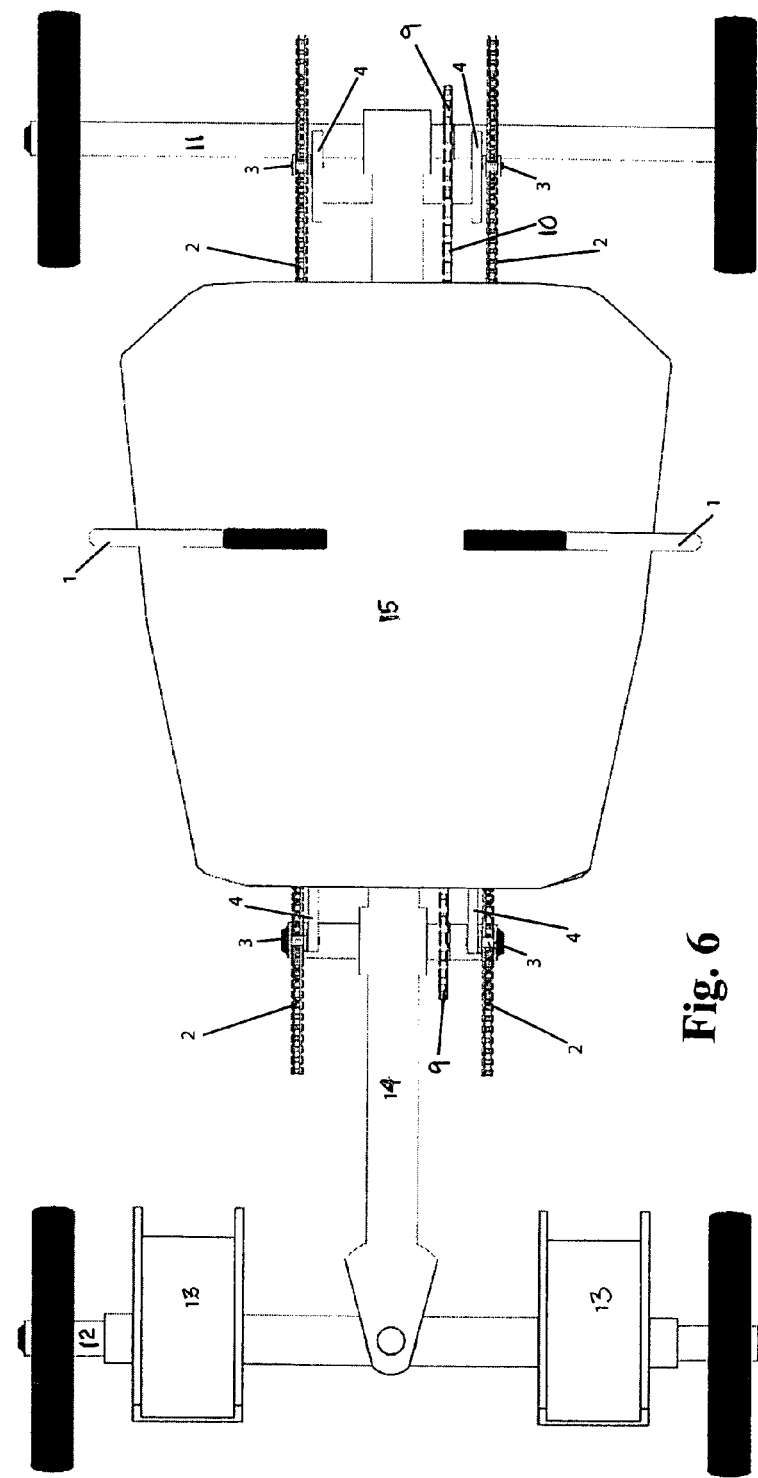
FIG. 6 is a top plan view of the cart of FIG. 1.
Figure 7:
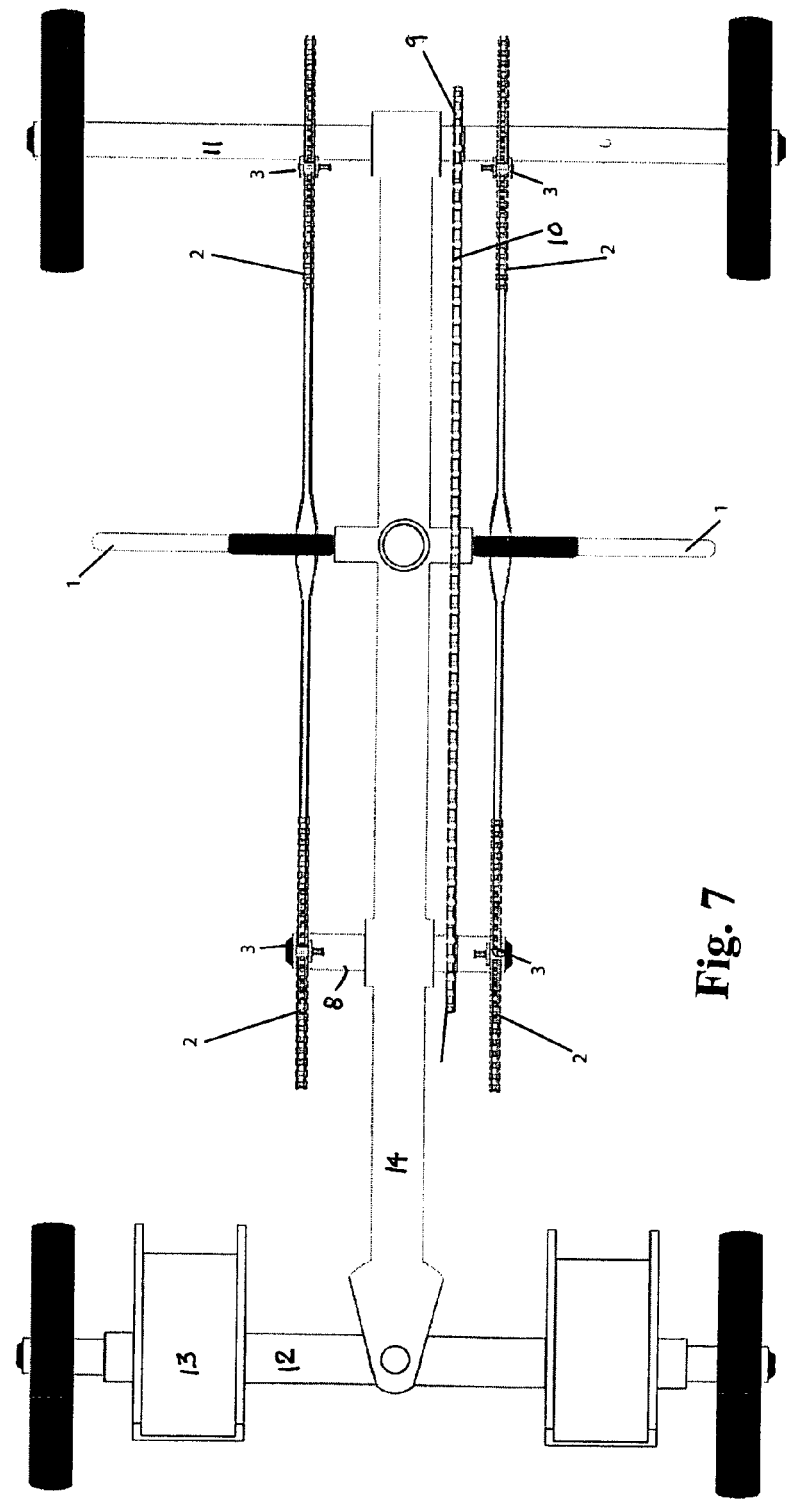
FIG. 7 is a top plan view of the cart shown in FIG. 6 with the seat removed.
Figure 8:
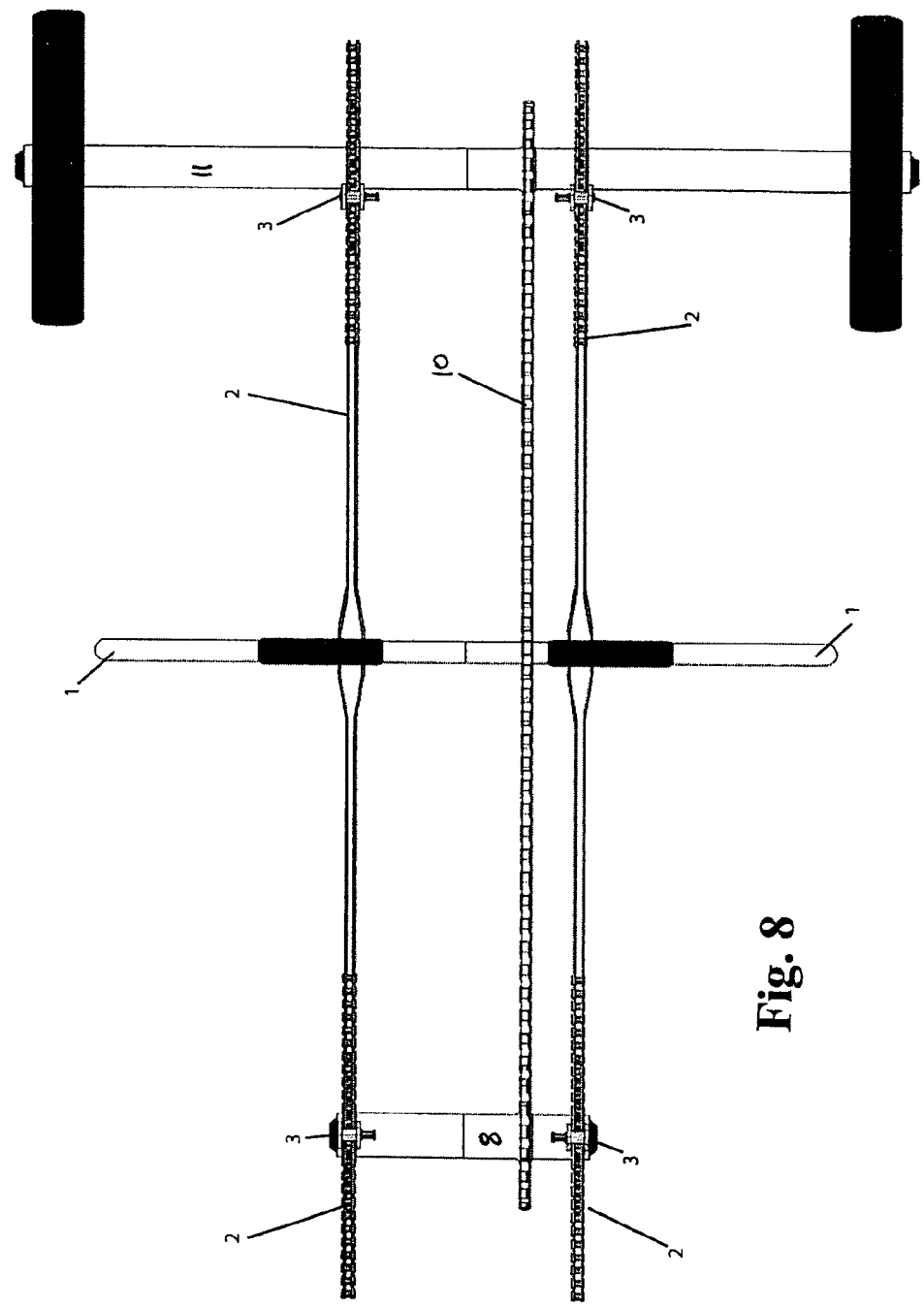
FIG. 8 is a top plan view of the horizontal gears of FIG. 1 connected to the drive gears as shown in FIG. 5.
Figure 9:
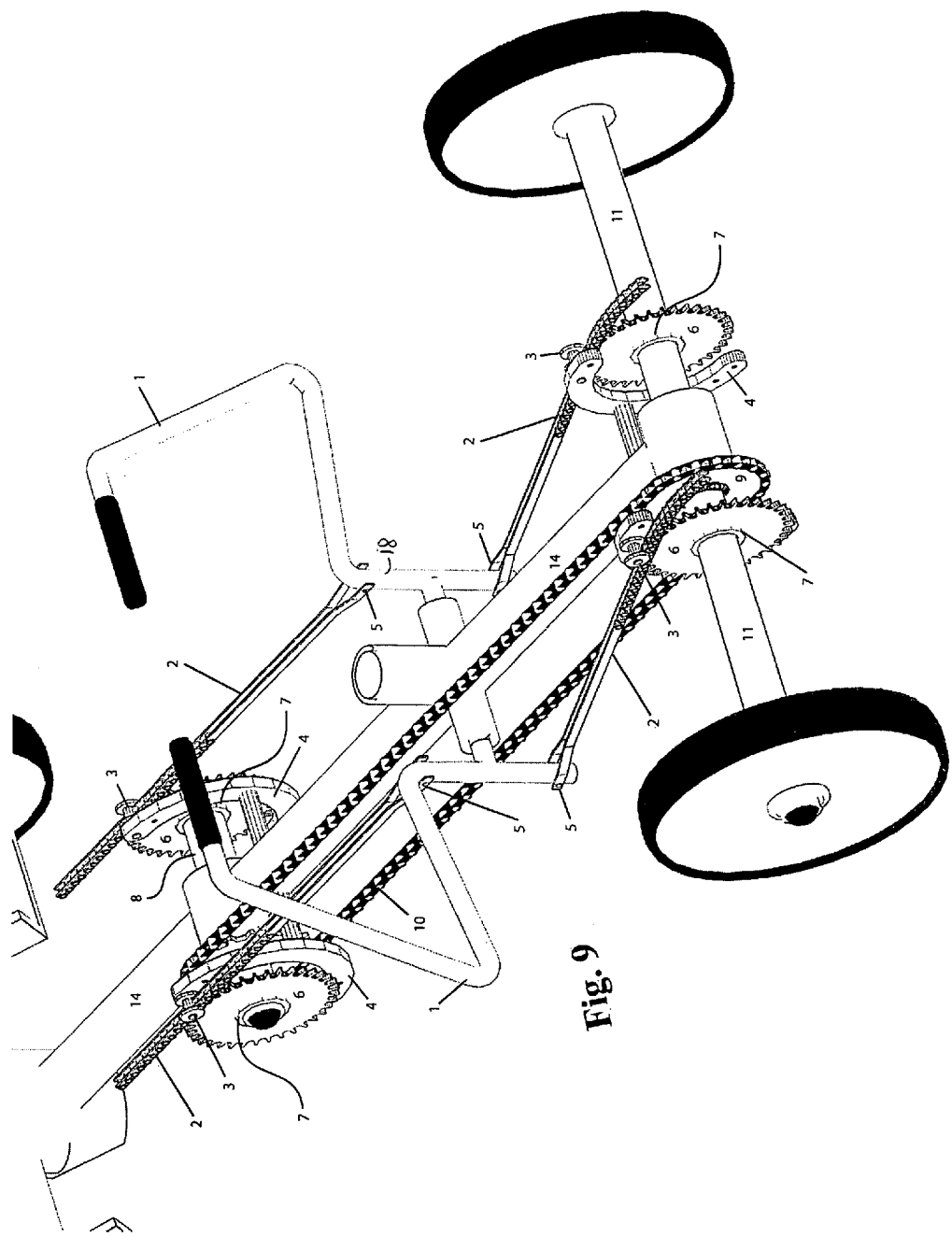
FIG. 9 is a partial perspective view of the rear of the cart of FIG. 2 showing the detailed gear arrangement of this embodiment of the invention.
Figure 10:
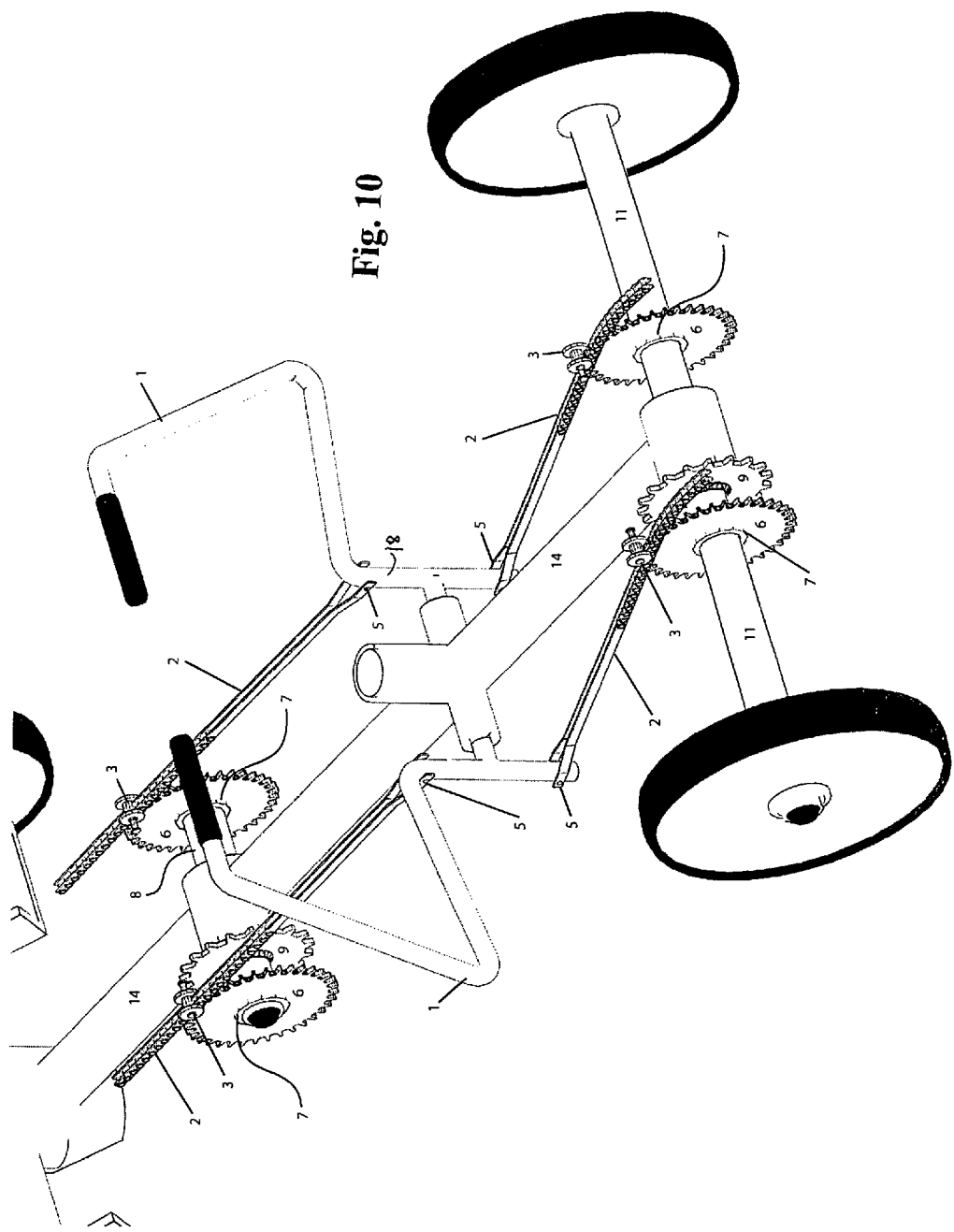
FIG. 10 is a partial perspective view of the invention as shown in FIG. 9 with the chain removed.
Figure 11:
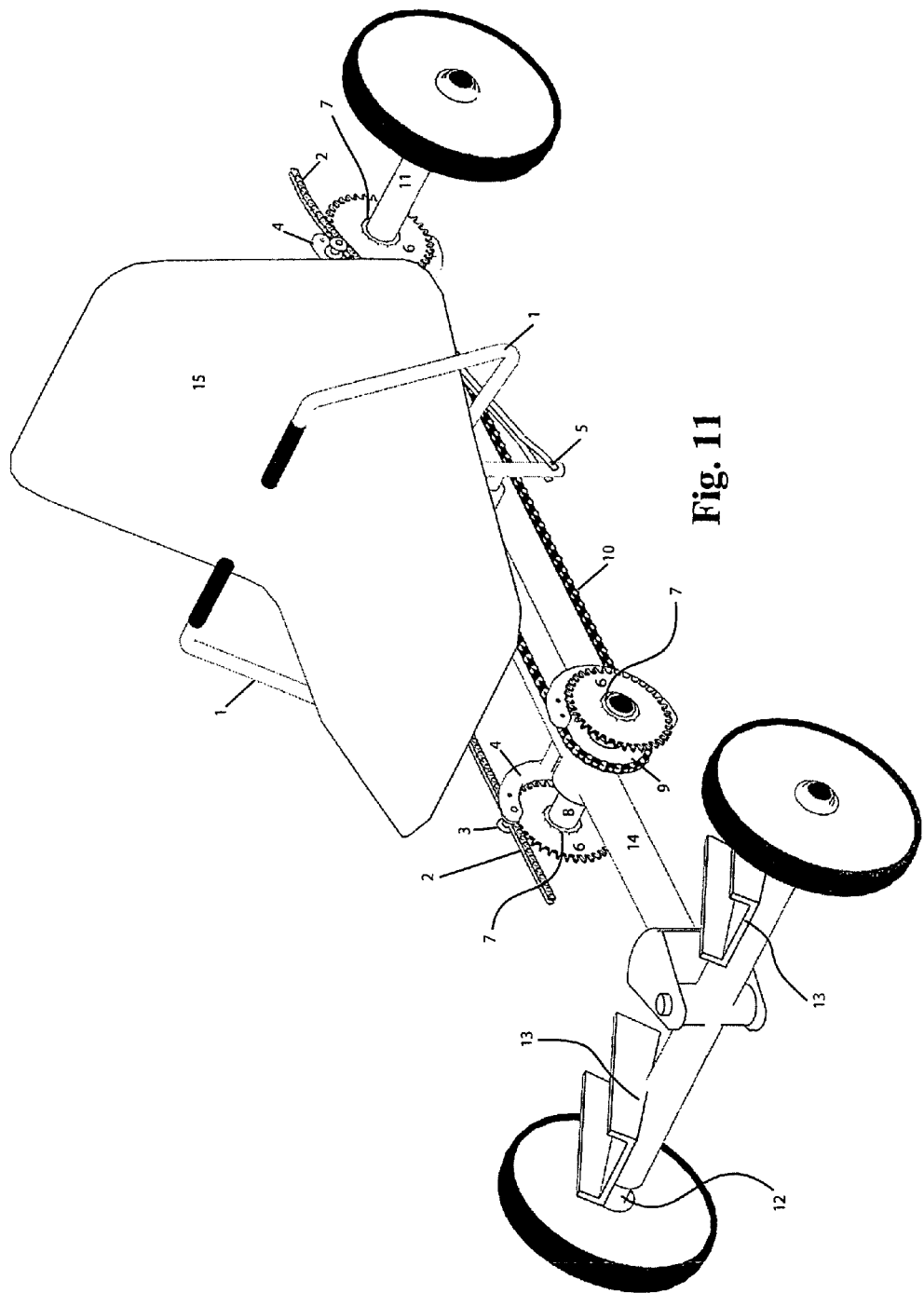
FIG. 11 is a front side perspective view of a second embodiment of a cart of the invention herein having a single forward horizontal gear.
Figure 12:
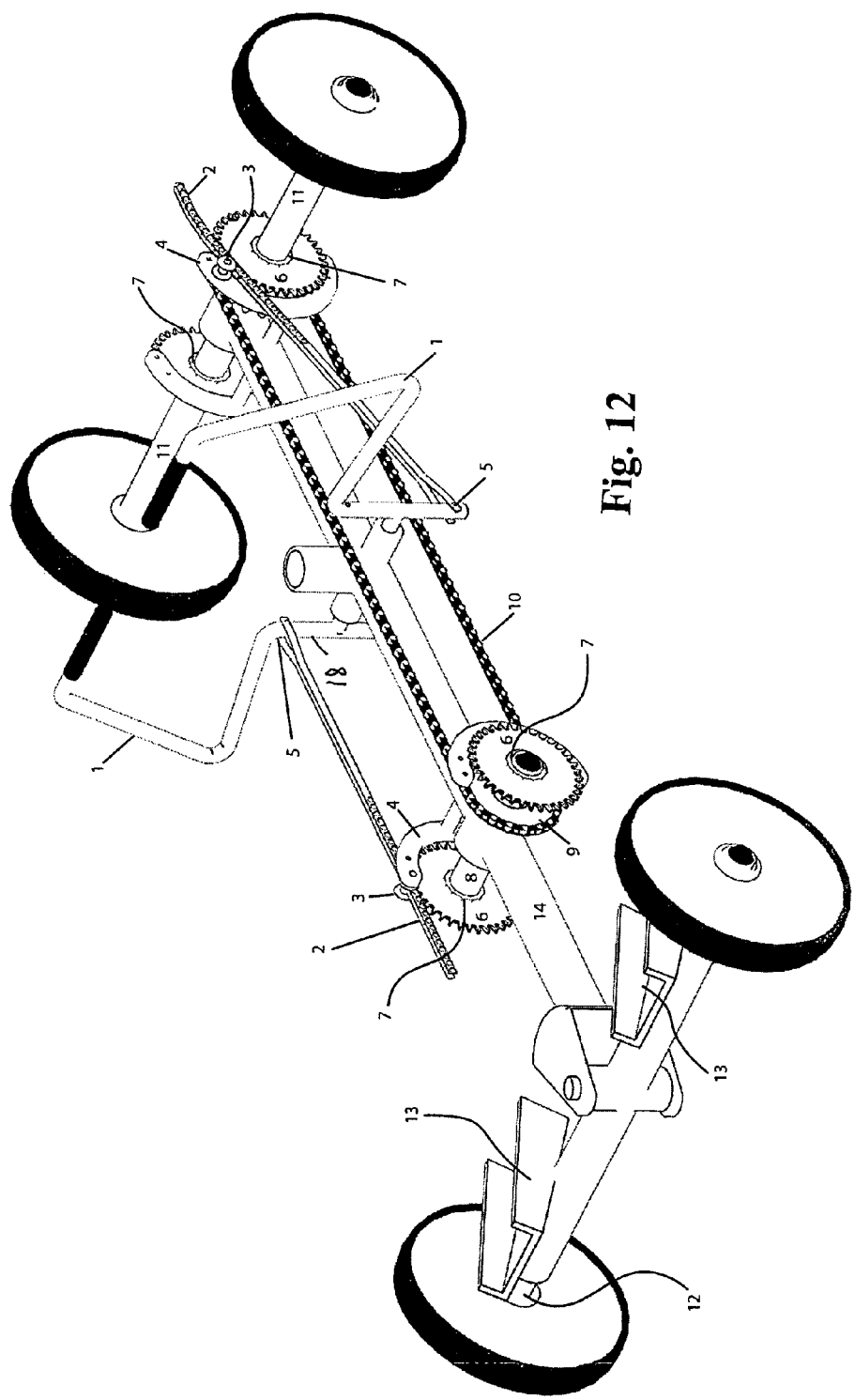
FIG. 12 is a front side perspective view of the cart of FIG. 11 with the seat removed.
Figure 13:
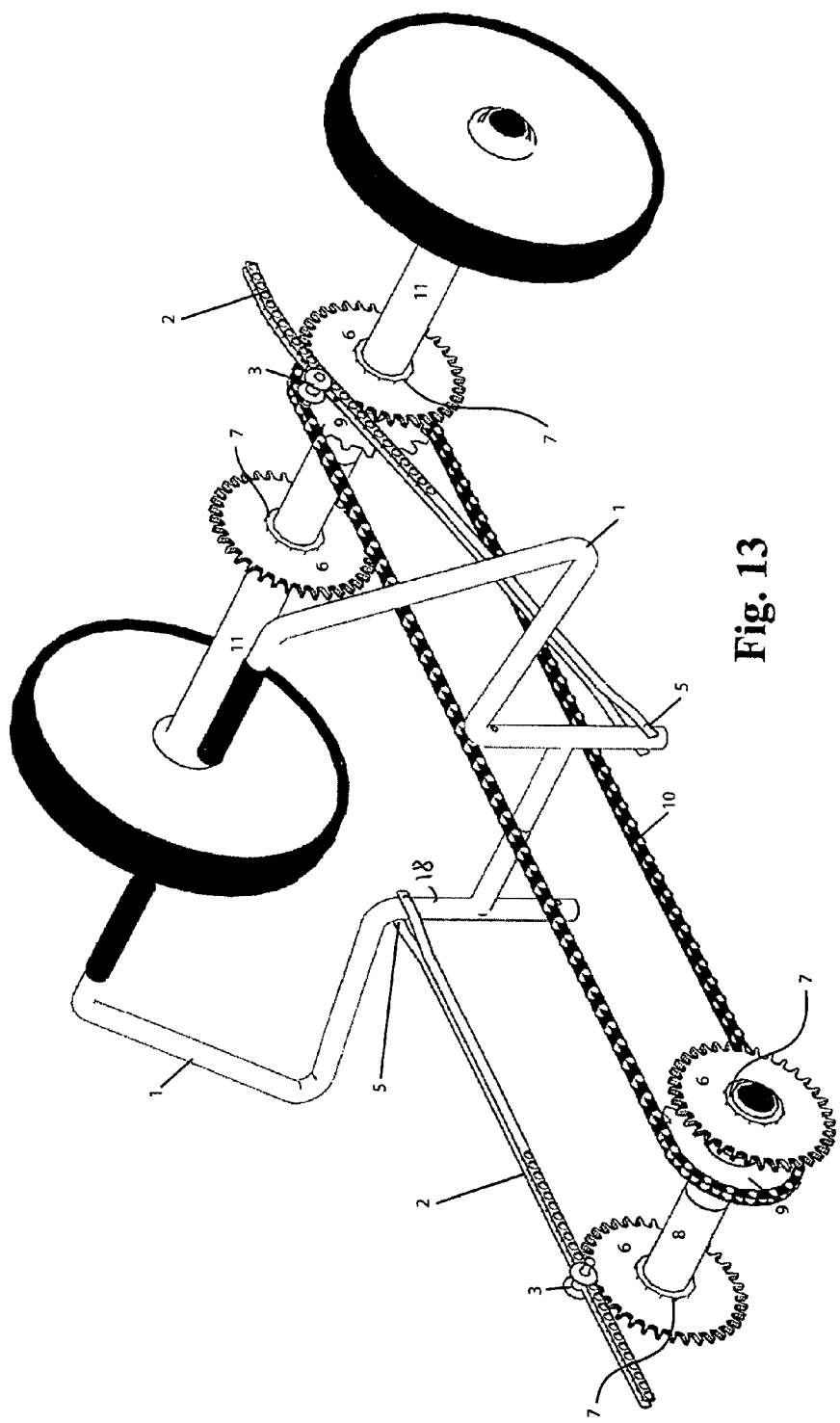
FIG. 13 is a front side perspective view of the cart of FIG. 11 with the frame and front wheels removed to show the gears.
Figure 14:
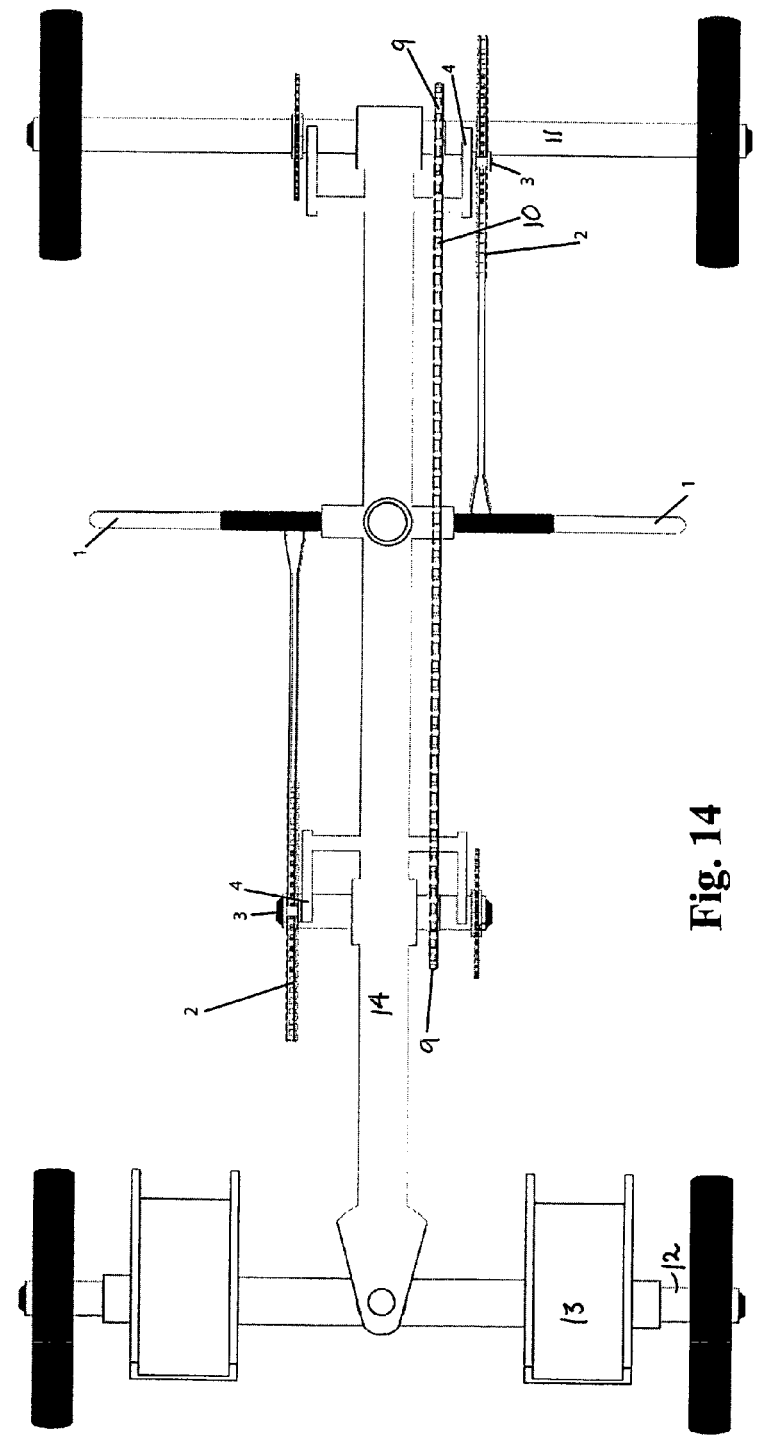
FIG. 14 is a top plan view of the cart of FIG. 11.
Figure 15:
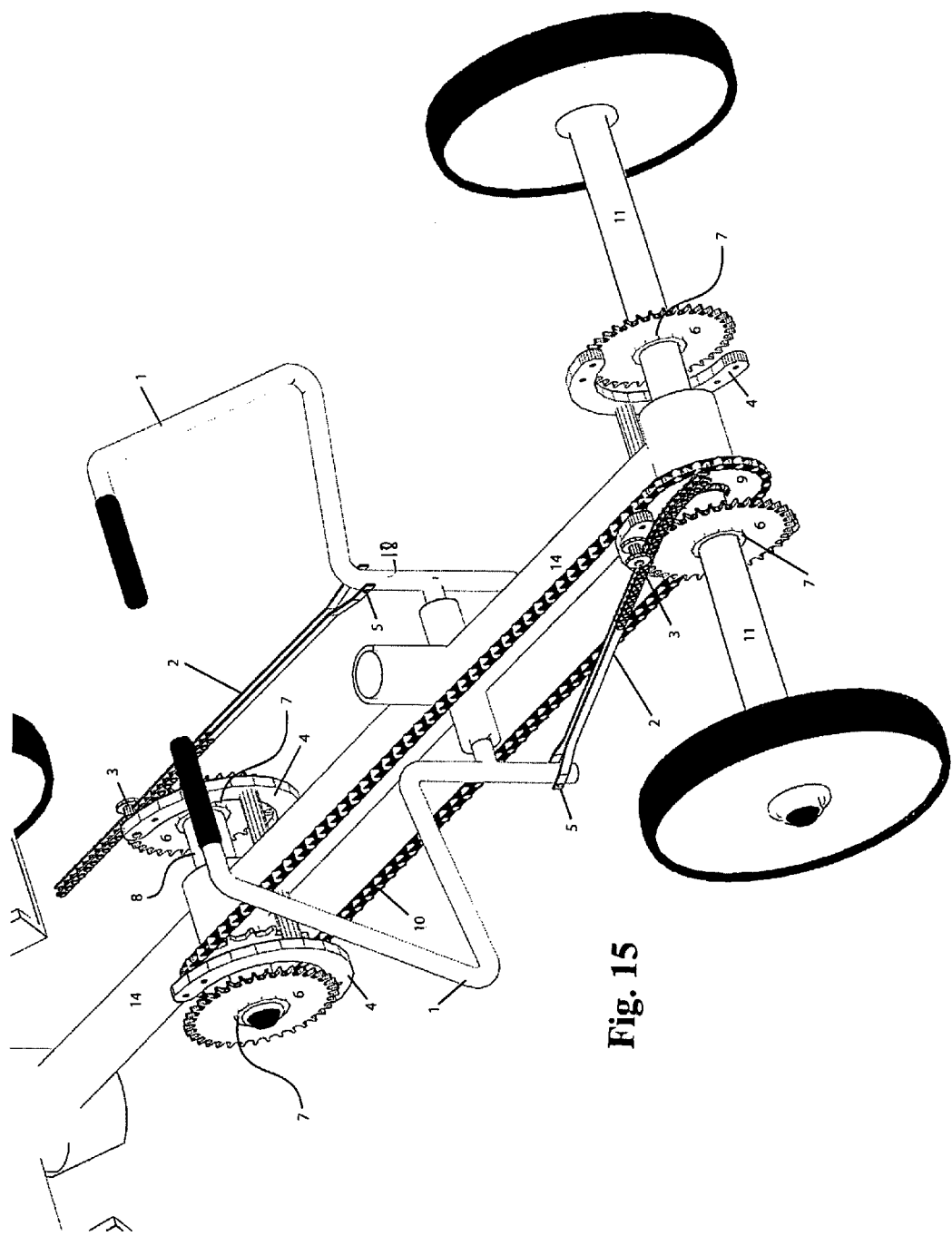
FIG. 15 is a partial perspective view of the rear of the cart of FIG. 11 showing the detailed gear arrangement of the second embodiment of the invention.
Figure 16:
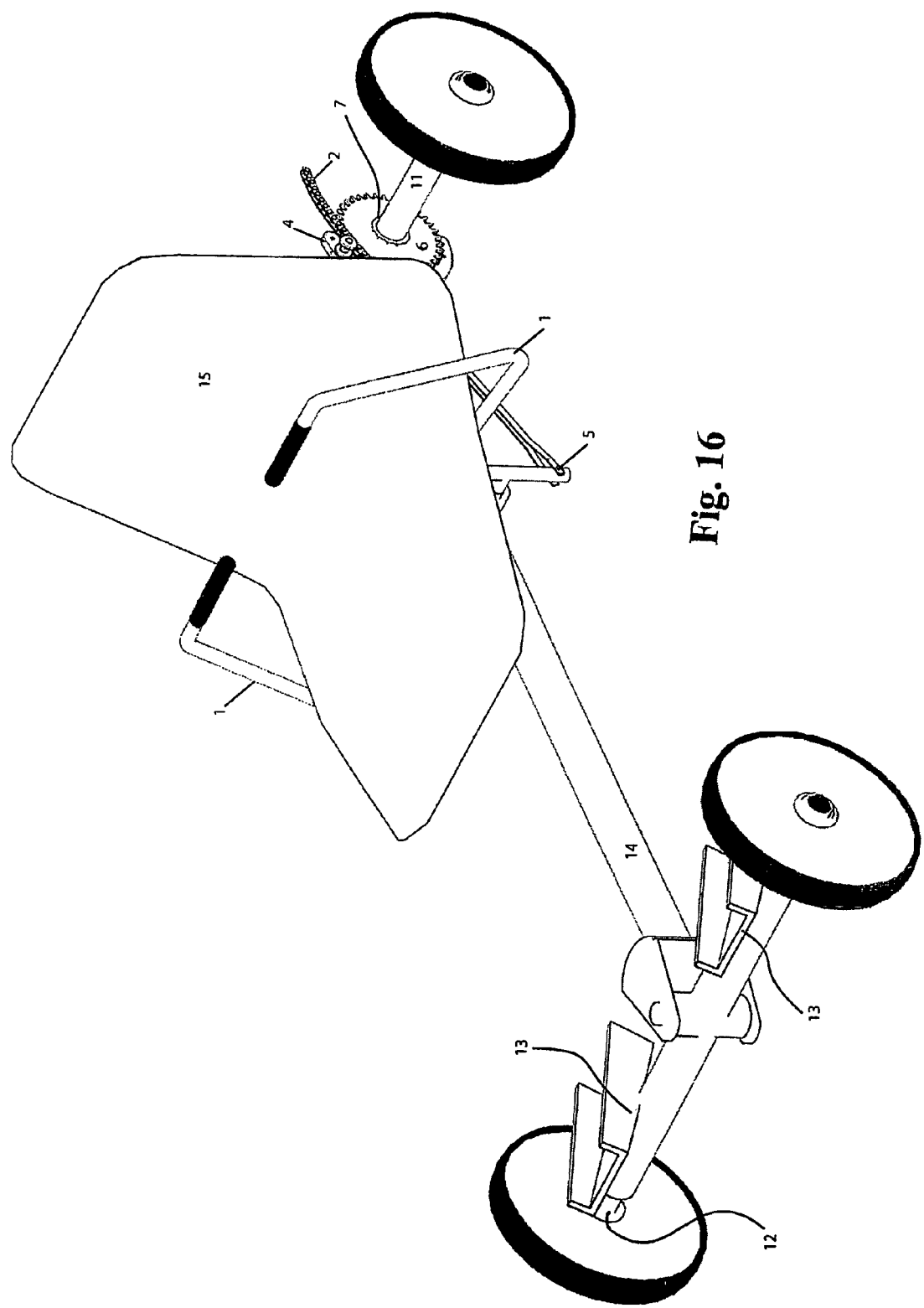
FIG. 16 is a front side perspective view of a third embodiment of the cart of the invention having a direct drive mechanism.
Figure 17:
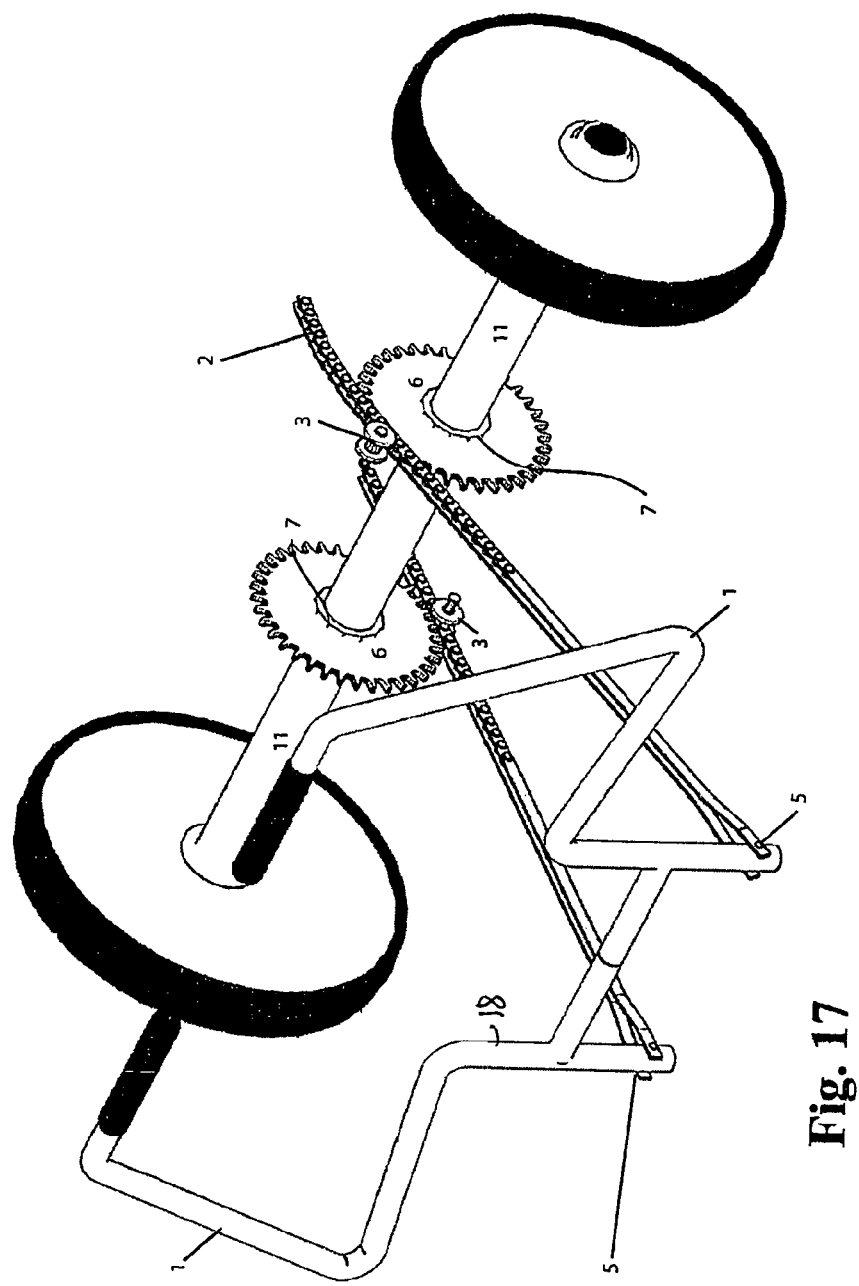
FIG. 17 is a front side perspective view of the cart of FIG. 16 with the frame and front wheels removed to show the gears.
Figure 18:
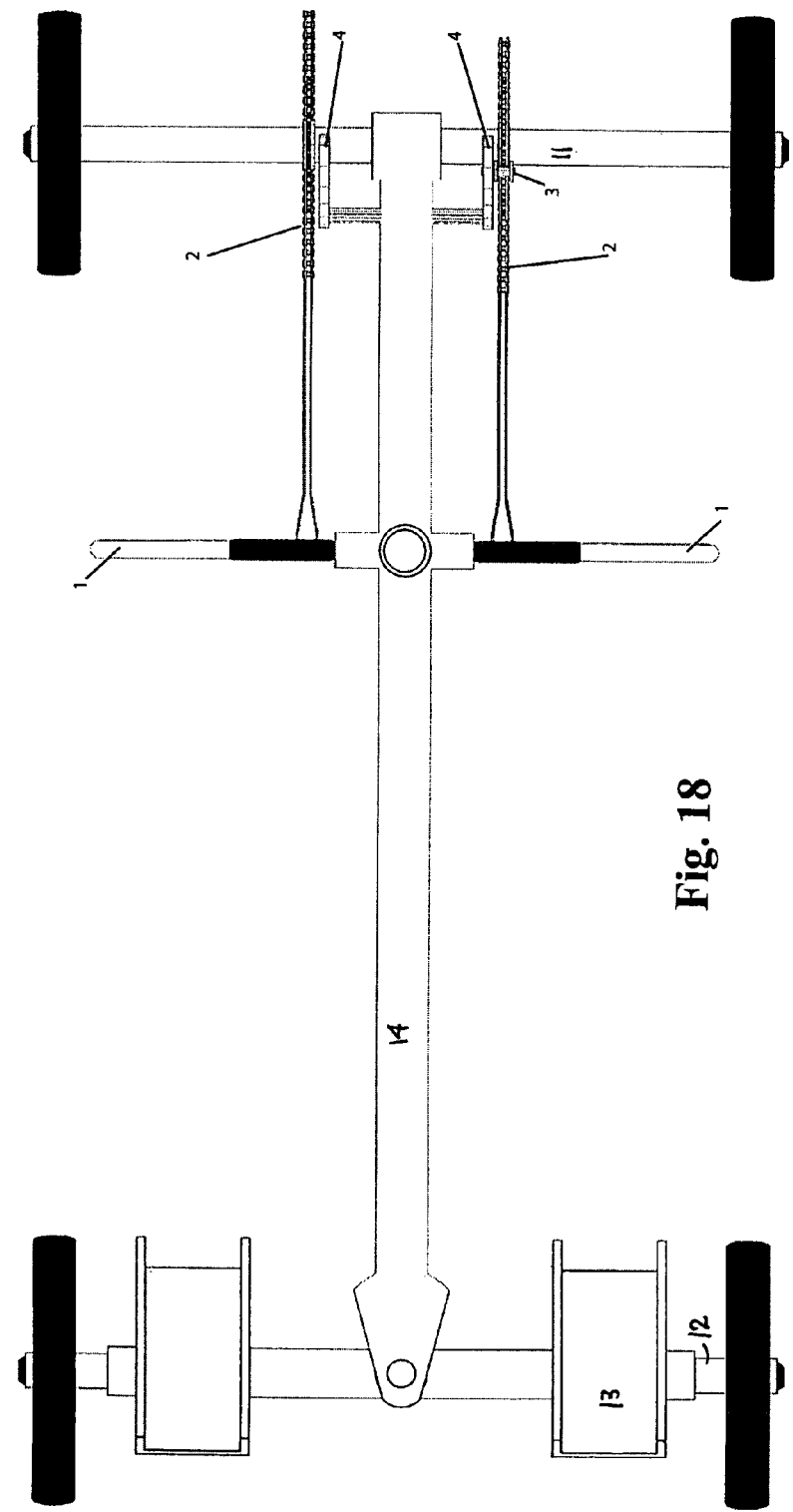
FIG. 18 is a top plan view of the cart of FIG. 16 without a seat.
Figure 19:
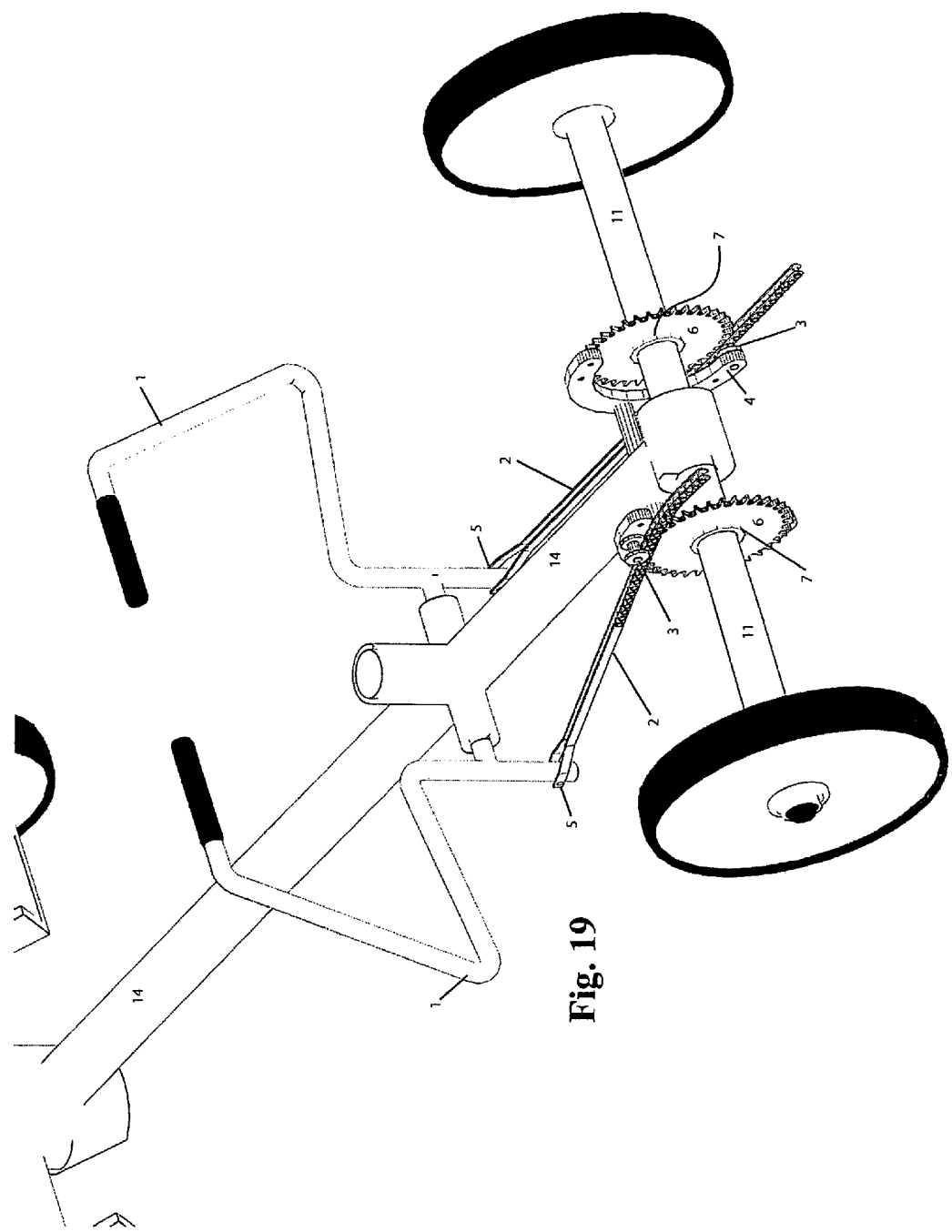
FIG. 19 is a partial perspective view of the rear of the cart of FIG. 16 showing the detailed gear arrangement of the third embodiment of the invention.

A horizontal gear bearing frame mount 4 is provided for each drive gear 6. Each horizontal gear bearing frame mount 4 is attached to the frame 14 and curves part way around its associated drive gear 6 as shown, for example, in FIGS. 9, 15 and 19. The curved horizontal gear bearing frame mounts 4 that surround the sprocket axle 8 toward the front of the vehicle are rearward of the associated drive gear 6, and the curved horizontal gear bearing frame mounts 4 that surround the rear axle 11 are forward of their associated drive gear 6 as shown in the figures. Thus each horizontal gear bearing frame mount 4 on the vehicle is "inside" its associated drive gear 6 (toward the inside and center of the vehicle) with respect to the respective front or rear of the vehicle. The primary function of each of the horizontal gear bearing frame mounts 4 is to hold and support the horizontal gear bearings 3 in a position to provide pressure and push against a distal area of the horizontal gear 2 so that the horizontal gear 2 is engaged with the teeth of the associated drive gear 6 as shown, for example, in FIG. 9 for the first embodiment of the invention (FIGS. 15 and 19, respectively, for the second and third embodiments discussed below). Thus, each horizontal gear 2 can mesh with the drive gear 6 on the distal end of that horizontal gear 2. As used with respect to the horizontal gears, the end that is farthest away from the site of attachment of that horizontal gear 2 to the hand lever arm is termed the "distal" end. These horizontal gears 2 are generally about perpendicular (90° to the axis of the hand lever arm 1 and thus are generally closer to horizontal than to vertical. In the first embodiment, the rear horizontal gears 2 are held in a slightly rearwardly upward position as shown in FIGS. 4-5 and 9, with the distal end meshing with the corresponding rear drive gear 6. Likewise, the rear horizontal gear 2 in the second embodiment is slopes upward toward the rear of the vehicle (FIG. 13) so that it is on top of the associated drive gear 6. In the third embodiment, both horizontal gears 2 extend rearward from the hand lever arm 1, with one of them extending upward to the top of its associated drive gear 6, and one of them extending slightly downward to the bottom of its associated drive gear 6 (FIG. 17). Preferably each horizontal gear 2 is made of steel and is about 13 inches long.

To move a cart to which the first embodiment of the invention herein is attached or of which the first embodiment of the invention is a part, the driver of the cart, places his or her hands on the hand lever arm 1. When the driver's hands are moved forward, the right angle bend 19 of the hand lever arms 1 move forward, causing the front horizontal gears 2 to move forward and to rotate the forward drive gears 6, the fixedly attached sprocket axle 8 and the fixed front drive sprocket 9

(keyed together with the front drive gear 6 on the sprocket axle 8). Rotation of the fixed front drive sprocket 9 causes the meshed drive chain 10 to turn, which turns rear axle 11 by means of the rear fixed drive sprocket 9, causing the rear wheels 22, and the vehicle to go forward. When the driver moves the hand lever arm forward, the rear (lower) drive gears 6 are released (ratcheted to neutral) due to the functioning of ratchets 7 as known in the art in the hub of the wheel and the gear.

When the driver's hands move rearward in the first embodiment, the lower end 21 of the hand lever arms 1 moves forward which causes the rear horizontal gears 2 to go forward. Because the rear horizontal gears 2 are above and meshed with the rear drive gears 6, the rear drive gears 6 turn in a counterclockwise movement, as do the keyed together rear axle 11 and rear fixed drive sprocket 9, which turns the rear wheels 22 to continue the vehicle's forward movement. The forward movement of the lower end 21 of the hand lever arm 1 causes the front horizontal gears to be ratcheted to neutral.

In the second embodiment of the invention herein (FIGS. 11-15), there are two forward drive gears 6, each of which is attached to an end of the sprocket axle 8, and two rearward drive gears 6, each of which is attached to the rear axle 11, as in the first embodiment. As in the first embodiment, on both the sprocket axle 8 and rear axle 11, the order of mounted features of the invention is drive gear 6, fixed drive sprocket 9, frame 14, and drive gear 6.

In contrast to the first embodiment of the invention, in the second embodiment of the invention there is only one forward horizontal gear 2 and one rearward horizontal gear 2. While these two horizontal gears 2 are shown as being on opposite sides of the vehicle (shown as the forward horizontal gear 2 on the right side and rearward horizontal gear 2 on the left side), primarily for weight and movement balance reasons, these can be on the same side without departing from the invention herein.

As in the first embodiment of the invention, to move a cart to which the second embodiment of the invention herein is attached or of which the second embodiment of the invention is a part, the driver of the cart, places his or her hands on the hand lever arm 1. When the driver's hands are moved forward, the right angle bend 19 of the hand lever arms 1 move forward, causing the attached single front horizontal gear 2 to move forward and to rotate the keyed forward drive gears 6, the fixedly attached sprocket axle 8 and the fixed forward drive sprocket 9 (keyed together with the front drive gear 6 on the sprocket axle 8). Rotation of the forward fixed drive sprocket 9 causes the meshed drive chain 10 to turn, which turns the single fixed rear drive sprocket 9 and the rear axle 11, causing the rear wheels 22, and the vehicle to go forward. When the driver moves the hand lever arm forward, the rear (lower) drive gears 6 are released (ratcheted to neutral) due to the functioning of ratchets 7 as known in the art in the hub of the wheel and the gear.

When the driver's hands move rearward in the second embodiment of the invention, the lower end 21 of the hand lever arm 1 moves forward which causes the rear horizontal gear 2 to go forward. Because the rear horizontal gear 2 is above and meshed with one of the rear drive gears 6, the rear drive gears 6 turn in a counterclockwise movement, as do the keyed together rear axle 11 and rear fixed drive sprocket 9, which turns the rear wheels 22 to continue the vehicle's forward movement. The forward movement of the lower end 21 of the hand lever arm 1 causes the front horizontal gears to be ratcheted to neutral.

In contrast to the first and second embodiments of the invention herein, the third embodiment, while still having horizontal gears 2 and a hand lever arm 1, does not have any forward gears, and is instead a direct gearing mechanism with respect to the rear axle 11. Thus, in the third embodiment, there is a rear drive gear 6 and a rear horizontal gear 2 and no chain sprocket or chain to push-pull the drive gears in the same direction, which makes rear axle 11 and wheels 22 turn. To accomplish continuous forward motion no matter whether the hand lever arm is pushed forward or rearward, there is one horizontal gear 2 on the top of a drive gear 6 (shown on the right side of the vehicle in FIGS. 17-19) and one horizontal gear 2 on the bottom of a drive gear 6 (shown on the left side of the vehicle in FIGS. 17-19).

When the hand lever arm 1 is moved forward, the lower end 21 of the hand lever arm 1 moves backward. The horizontal gear 2 on the top of its associated drive gear 6 is ratcheted to neutral, and the horizontal gear 2 on the bottom of its associated drive gear 6 rotates to cause the keyed rear axle 11 to rotate and move the wheels 22 forward. When the hand lever arm 1 is moved rearward, the lower end 21 of the hand lever arm 1 moves forward. The horizontal gear 2 on the bottom of its associated drive gear 6 is ratcheted to neutral, and the horizontal gear 2 on the top of its associated drive gear 6 rotates to cause the keyed rear axle 11 to rotate and move the wheels 22 forward.

While particular suggested dimensions are provided herein, particularly for use with a standard-sized bicycle frame, it is clear that the invention herein may be sized smaller or larger with the same advantageous results.

It is also within the scope of the invention herein to provide other wheeled, pedaled vehicles with the drive mechanism and pedal lever arm of the invention herein.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. A drive mechanism for a wheeled vehicle having a frame, at least two axles, and at least three wheels, comprising:
    a) a hand lever arm movable forward and backward by a driver of the vehicle;
    b) at least two horizontal gears comprising a first horizontal gear and a second horizontal gear, each horizontal gear associated and meshed with a toothed drive gear on at least one axle of the vehicle and each horizontal gear being attached to the hand lever arm;
    c) a horizontal gear bearing and a horizontal gear bearing frame mount associated with each horizontal gear, and aligned to push the horizontal gear to engage the drive gear;
    d) a ratchet mechanism on each drive gear,
        wherein movement of the hand lever arm forward causes: i) the first horizontal gear to rotate the drive gear associated with the first horizontal gear, which causes the wheels to move forward, and ii) the ratchet mechanism on the drive gear associated with the second horizontal gear to release the drive gear associated with the second horizontal gear; and wherein movement of the hand lever arm rearward causes: i) the second horizontal gear to rotate the drive gear associated with the second horizontal gear, which causes the wheels to move forward, and ii) the ratchet mechanism on the drive gear associated with first horizontal gear to release the drive gear associated with the first horizontal gear, wherein the first horizontal gear and the second horizontal gear extend rearward from the hand lever arm; wherein the at least one axle is a rear axle of the vehicle; and wherein the first horizontal gear is meshed with a bottom of the drive gear associated with the first horizontal gear, and the second horizontal gear is meshed with a top of the drive gear associated with the second horizontal gear.

2. A drive mechanism for a wheeled vehicle having a frame, at least two axles, and at least three wheels, comprising:
   a) a hand lever arm movable forward and backward by a driver of the vehicle;
   b) at least two horizontal gears comprising a first horizontal gear and a second horizontal gear, each horizontal gear associated and meshed with a toothed drive gear on at least one axle of the vehicle and each horizontal gear being attached to the hand lever arm;
   c) a horizontal gear bearing and a horizontal gear bearing frame mount associated with each horizontal gear, and aligned to push the horizontal gear to engage the drive gear;
   d) a ratchet mechanism on each drive gear,
   wherein movement of the hand lever arm forward causes: i) the first horizontal gear to rotate the drive gear associated with the first horizontal gear, which causes the wheels to move forward, and ii) the ratchet mechanism on the drive gear associated with the second horizontal gear to release the drive gear associated with the second horizontal gear; and wherein movement of the hand lever arm rearward causes: i) the second horizontal gear to rotate the drive gear associated with the second horizontal gear, which causes the wheels to move forward, and ii) the ratchet mechanism on the drive gear associated with first horizontal gear to release the drive gear associated with the first horizontal gear, wherein the first horizontal gear extends forward from the hand lever arm and the second horizontal gear extends rearward from the hand lever arm; wherein the at least one axle comprises a rear axle and a sprocket axle; and wherein the first horizontal gear is meshed with a top of the associated drive gear on the sprocket axle and the second horizontal gear is meshed with a top of the associated drive gear on the rear axle, the drive mechanism further comprising a drive chain extending between and connected to a fixed drive sprocket on both the rear axle and the sprocket axle and the fixed drive sprocket being turned by movement of the chain, wherein turning of each of the fixed drive sprockets causes turning of the drive gear that is on the same axle as the fixed drive sprocket.

3. The drive mechanism of claim 2, further comprising a third horizontal gear extending forward from the hand lever arm in mirror image to the first horizontal gear and on the opposite side of the vehicle as the first horizontal gear, and a fourth horizontal gear extending rearward from the hand lever arm in mirror image to the second horizontal gear and on the opposite side of the vehicle as the second horizontal gear.

4. A drive mechanism for a wheeled vehicle having a frame, at least two axles, and at least three wheels, comprising:
   a) a hand lever arm movable forward and backward by a driver of the vehicle;
   b) at least two horizontal gears comprising a first horizontal gear and a second horizontal gear, each horizontal gear associated and meshed with a toothed drive gear on at least one axle of the vehicle and each horizontal gear being attached to the hand lever arm;
   c) a horizontal gear bearing and a horizontal gear bearing frame mount associated with each horizontal gear, and aligned to push the horizontal gear to engage the drive gear;
   d) a ratchet mechanism on each drive gear,
   wherein movement of the hand lever arm forward causes: i) the first horizontal gear to rotate the drive gear associated with the first horizontal gear, which causes the wheels to move forward, and ii) the ratchet mechanism on the drive gear associated with the second horizontal gear to release the drive gear associated with the second horizontal gear; and wherein movement of the hand lever arm rearward causes: i) the second horizontal gear to rotate the drive gear associated with the second horizontal gear, which causes the wheels to move forward, and ii) the ratchet mechanism on the drive gear associated with first horizontal gear to release the drive gear associated with the first horizontal gear, wherein the first horizontal gear is attached to the hand lever arm at a location above the attachment of the second horizontal gear to the hand lever arm.

* * * * *